Patented Apr. 30, 1946

2,399,361

UNITED STATES PATENT OFFICE 2,399,361

MANUFACTURE OF CYANOGEN

Burritt S. Lacy, Harlan A. Bond, and Wilbie S. Hinegardner, Niagara Falls, N. Y., assignors to E. I. du Pont de Nemours & Company, Wilmington, Del., a corporation of Delaware No Drawing. Application November 2, 1942, Serial No. 464,252

12 Claims. (Cl. 23—151)

This invention relates to the production of cyanogen and more particularly to a method for converting hydrogen cyanide to cyanogen.

Cyanogen is a colorless gas of high stability which is useful for a variety of chemical syntheses and other chemical operations and as a lethal agent, for example in fumigation. Heretofore cyanogen has not been manufactured in large quantities nor used to the extent implied by its useful properties, no doubt because of the unsatisfactory and relatively expensive character of known methods for making this compound. Cyanogen was discovered in 1815 by Gay-Lussac, who prepared it by thermal decomposition of mercuric cyanide. Proposed improvements since that date have similarly involved methods such as decomposition of heavy metal cyanides by heating at high temperatures or in aqueous media from copper sulphate and alkali cyanides. Cyanogen also has been made by decomposition of organic nitrogen-containing compounds, for example by heating oxamide. Such methods are expensive, inefficient and unsatisfactory for economical large scale production of a chemical product.

An object of the present invention is to provide a new and improved process for the preparation of cyanogen. A further object is to react hydrogen cyanide with chlorine or a chlorinating agent, whereby the hydrogen cyanide is converted in good yield to cyanogen and hydrogen chloride. A further object is to convert hydrogen cyanide to cyanogen by reaction with cyanogen chloride. Still other objects will be apparent from the following description.

We have discovered that by reacting hydrogen cyanide with chlorine in the vapor phase at elevated temperatures, the following new reaction can be carried out practically quantitatively without appreciable formation of polymers or other undesired by-products.

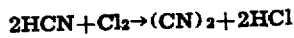
$$2HCN + Cl_2 \rightarrow (CN)_2 + 2HCl$$

The reaction may be carried out simply by mixing hydrogen cyanide and chlorine in the stoichiometrical proportions as indicated by the above equation and passing the mixture through a suitable reaction chamber at an elevated temperature which for example, may vary from about 200 to 1000° C.

The reaction temperature must be sufficiently high to cause the formation of cyanogen at a satisfactorily high rate. For this purpose the minimum temperature required will vary, depending upon space velocity and the characteristics of the reaction chamber employed. For example, we have found that when the reaction chamber is an empty glass or quartz tube having smooth sidewalls, it is generally necessary to maintain a reaction temperature not lower than 600 to 700° C., in order to obtain conversion of the hydrogen cyanide to cyanogen at economically high rates. On the other hand if the reaction chamber is packed with a surface active material, the minimum temperature will be lowered considerably. Various known surface active materials may be used, or the reaction chamber may be packed with any inert solid material which will provide a larger area of surface. In general, however, the greater the surface activity of the packing material, the lower will be the minimum required reaction temperature. For example, when the reaction chamber is packed with a good grade of activated carbon, the reaction occurs at appreciable rates at temperatures as low as 200-300° C. We therefore generally prefer to use a surface active packing material such as activated carbon, silica gel and the like and operate at reaction temperatures of from 200-300° C. and higher.

The necessary reaction temperature will depend on the space velocity, i. e., the rate of flow through the reaction space. That is, a low reaction temperature requires a correspondingly low space velocity, while higher temperatures accelerate the reaction and permit the employment of high space velocities. For example, with an empty reaction space at a temperature of around 700-750° C., the space velocity (for isothermal reaction) preferably should be not over about 50 space volumes per hour (S. V. H.) where one space volume equals the volume of the reaction space. On the other hand at temperatures of around 850° C. the permissible space velocity may be as high as around 1500 S. V. H. Similarly, with some activated carbon catalysts at temperatures around 300° C., a space velocity of 15 S. V. H. or lower should be used, while at temperatures of 650° C. or higher the space velocity may be around 1500 S. V. H.

Under the preferred operating conditions as above described, practically complete conversion of hydrogen cyanide to cyanogen is obtained. However, the invention is not restricted to those conditions, as cyanogen begins to form at lower temperatures. For example, with the activated carbon catalyst, more or less cyanogen may be formed at temperatures as low as around 100° C., and with no catalyst at temperatures of 450° C. or lower, at sufficiently low space velocities. Under such conditions, the reaction product may be a mixture of cyanogen and cyanogen chloride.

We have further discovered that equivalent results can be obtained when cyanogen chloride is used in place of chlorine whereby the following new reaction occurs:

$$HCN + CNCl \rightarrow (CN)_2 + HCl$$

In carrying out this reaction, reaction conditions similar to those described above for reaction with chlorine may be utilized with equally good results.

Thus, the formation of cyanogen by our process may be considered as occurring in two stages:

(1) $HCN + Cl_2 \rightarrow CNCl + HCl$
(2) $HCN + CNCl \rightarrow (CN)_2 + HCl$ By reacting two moles of HCN with one mole of chlorine, the two stages may occur concurrently. If desired the first stage reaction (1) may be carried out under such conditions that little or no cyanogen formation occurs by reaction (2) and the resulting cyanogen chloride (with or without first separating the by-product HCl) may be converted to cyanogen by reaction (2). We have found that the two reactions tend to occur at different temperatures, reaction (1) usually being complete at temperatures where reaction (2) is incomplete. Under certain conditions of space velocity, especially in the presence of a catalyst (for example as described by Sernagiotto, Giorn. Chim. Ind. Appl. 3: 153, 1921; Chem. Abs. 15: 2593) reaction (1) is complete below the minimum temperature required to initiate reaction (2). For example at a reaction temperature of 100° to 200° C. and an S. V. H. of 500, in the presence of a surface active catalyst such as activated carbon, reaction (1) goes to completion to convert HCN to cyanogen chloride with practically no cyanogen formation. Under the same conditions, except at a temperature of 400–500° C., reaction (2) is initiated. In the absence of a catalyst, the initiation temperatures are higher for both reactions and generally both reactions occur concurrently. It is thus possible, by selection of reaction conditions to produce either a mixture of cyanogen chloride and cyanogen or to produce either product substantially uncontaminated by the other.

It should be understood that the above described reaction temperatures are for isothermal reaction in the reacting gases. If for practical reasons an essentially adiabatic reaction (i. e. in a thermally insulated reactor) is desired, then, since the reactions are highly exothermic, the gases are fed to the reactor at temperatures suitably below the desired final reaction temperature and yet high enough to initiate the reaction at a satisfactorily high velocity. The appropriate initial temperature of the incoming gases thus will depend on the space velocity, rate of radiation or other cooling in the reactor, etc. and may be calculated for the particular conditions which are employed. Generally we prefer to preheat the reactants to a temperature several hundred degrees below the desired maximum offgas temperature and operate at a space velocity of 100 to 1500 S. V. H.

In a preferred mode of operation which is described in the way of example, we may react hydrogen cyanide with chlorine in the presence of activated carbon in an adiabatic reactor. The reactant mixture, in the proportions of 1.0 mole chlorine gas at room temperature added to about 2.1 moles hydrogen cyanide vapor at 100° C. (i. e. 5%, or in general say about 1 to 10%, in excess of the stoichiometrical 2.0 moles of hydrogen cyanide corresponding to complete reaction of the chlorine) is diluted with about half its volume of recycled offgas (that is with about 0.5 mole $(CN)_2 + 1.0$ mole HCl), which has been partially cooled to about 250° C.; this results in the total mixture entering the reactor at about 140° C. (though this last temperature may be varied widely). The flow rates used depend of course on the reaction temperatures employed, as well as on the activity of the catalyst, but good results are obtainable at an S. V. H. of 500 (or even considerably higher), corresponding for the above-given total mixture to an S. T. Y. of about 380; where S. V. H. denotes cu. ft. of total gas entering the reactor per hour per cu. ft. of catalyst, the gas volume being reckoned at normal temperature and pressure, and S. T. Y. denotes lbs. cyanogen produced by the reaction per 24 hours per cu. ft. catalyst.

Under the above conditions, the first stage of the process, that is the reaction $$Cl_2 + HCN = ClCN + HCl$$

is initiated and goes on with great rapidity, as the mixture at 140° enters, and traverses the inlet portion of, the catalyst bed of activated carbon; and the temperature reached adiabatically as a result of this exothermic reaction is in the neighborhood of 500°. When—and even somewhat before—this last temperature is reached however, the second step of the process, i. e.

$$CNCl + HCN = (CN)_2 + HCl$$

also is initiated at a good rate; and this second step, if carried on strictly adiabatically, results in the offgas from it, consisting of 1.0 mole $(CN)_2 + 2.0$ moles HCl (plus the original recycled 0.5 mole $(CN)_2 + 1.0$ mole HCl, plus the few percent of excess HCN) leaving the catalyst bed at a temperature of around 880° C. (The latter temperature does no harm to the reactants nor to the catalyst, though actually it may be considerably reduced by thermal conduction through the insulation of the reactor; practically it makes little difference whether the final temperature is 700° or 880°.)

The offgas is then cooled, and passed through a water scrubber, which removes hydrogen chloride as a concentrated solution, together with a minute fraction of the total cyanogen. The cyanogen issuing from the top of the scrubber, after drying, is substantially pure, except for a slight amount of hydrocyanic acid resulting from the small excess of the latter used in the reactant mixture, from which it is readily purified by rectification. The hydrochloric acid solution produced in the scrubber may be further treated by conventional means to remove its very small content of dissolved hydrogen cyanide and cyanogen, and forms a usable by-product.

The purpose of diluting the reactant mixture with recycled partially cooled offgas is primarily to prevent the final offgas temperature reached in adiabatic second stage reaction from being unduly high; while the gas is brought into the reactor warm (140° C.) instead of at room temperature, in order that the offgas from the first stage reaction shall be hot enough to initiate the second stage reaction at a high rate. However, even if the reactant gases are brought at room temperature (e. g. 30° C.) into the adiabatic reactor, the first stage reaction will nevertheless initiate itself at a fair rate; and if too high a proportion of recycled gas has not been added as diluent, the gas, as a result of the first stage reaction, will still be hot enough to initiate the second stage reaction at a fair rate. In other words the preheating is advantageous under certain conditions, but is not essential. In cooling the final offgas, instead of reducing its temperature directly from 880° to say 100° or less by a conventional water-cooled tubular cooler, it may first be instantaneously "chilled" from 880° C. to say 250° C. by mixing with recirculated offgas at 100° C., and then the 250° C. mixture (after recycling from it the 0.5(CN)₂+1.0HCl desired as hot diluent for the initial reactant mixture) is cooled from 250° C. to say 100° C. or less in a conventional cooler.

The above example is merely illustrative as to temperatures, rates, etc. Thus if the operation is carried on in an isothermal reactor, there will be no point in adding any recycled gas as diluent for the reactant mixture, and the whole operation may be carried on at a temperature of for example 500–700°; or the first stage reaction may be carried on at say 30°–200° and the second stage at 400–700°. Moreover the proportion of diluent recycled offgas added to the reactant mixture, and its temperature, may if desired be varied quite widely from the values given in the example.

In a preferred method for practicing our invention without the use of a catalyst or packing material, the reactant gases, diluted with about twice their volume of recycled hot offgas, and the whole at a temperature of around 500–600° C., are passed through a large empty reaction space at a space velocity of about 100 S. V. H. During the course of the reaction, the temperature (without allowing for thermal losses) will rise to around 900–1000° C. The offgas is then treated in the same general way as described above. Although the invention is not restricted to any particular proportions of hydrogen cyanide and chlorine or cyanogen chloride passed into the reaction space, we usually prefer to use close to the stoichiometric proportions, i. e. slightly more than 2 moles of hydrogen cyanide to one mole of chlorine, or slightly more than one mole of hydrogen cyanide to one mole of cyanogen chloride, in order to insure a considerable reaction velocity even near the end of the reaction, and consequently an essentially complete absence of chlorine in the offgas.

While as explained above, there is a minimum temperature at which complete conversion to cyanogen occurs and which depends upon surface conditions within the reactor and space velocity, there is no theoretical upper limit to the permissible reaction temperature except the decomposition temperature of cyanogen, which thermally is very stable. We have, for example, satisfactorily operated the above-described reactions at temperatures as high as 950° C. without causing appreciable formation of polymers or other undesired by-products. Under such conditions we have obtained substantially quantitative yields of cyanogen.

Operating without the use of a surface active material, that is, in an empty reaction space having quartz sidewalls, we have obtained quantitative conversion of HCN to cyanogen at reaction temperatures of from 670° C. to 950° C. With different grades of activated carbon we have obtained quantitative yields of cyanogen in our process at reaction temperatures of from 170° C. to 600° C. and higher, depending on the space velocity. With broken silica shards of 8-mesh size, we have obtained quantitative yield of cyanogen at a reaction temperature of about 700° C. It is understood that there is no harm in permitting the temperature to rise to 900° C. or even higher, even though the reaction is carried out in the presence of a surface active material such as activated carbon which permits the reaction to occur at a lower temperature.

Our process is simple and easy to carry out in practice. When a surface active catalyst such as activated carbon or other reactor packing is used, the process may be operated for indefinite periods of time with no decrease in yield or rate of production. There is no substantial deposition of solids or reaction by-products on the catalyst or packing material and catalyst regeneration is unnecessary. Likewise, when no catalyst or packing is used, the reactor remains clean over indefinite periods. No undesirable by-products are formed in any appreciable quantity and a pure product is obtained which may be recovered from the reaction mixture without substantial loss and with a minimum of purification operations.

We claim:
1. The process for the production of cyanogen which comprises mixing hydrogen cyanide with a chlorinating agent selected from the group consisting of chlorine and cyanogen chloride, the proportions being at least two moles of hydrogen cyanide to one mole of chlorine, when chlorine is the chlorinating agent, and subjecting said mixture to reaction conditions at a temperature not lower than about 200° C.

2. The process for the production of cyanogen which comprises mixing hydrogen cyanide with a chlorinating agent selected from the group consisting of chlorine and cyanogen chloride, the proportions being at least two moles of hydrogen cyanide to one mole of chlorine, when chlorine is the chlorinating agent, and subjecting said mixture to reaction conditions at a temperature not lower than about 200° C. in the presence of a catalyst comprising a surface-active material.

3. The process for the production of cyanogen which comprises mixing hydrogen cyanide with a chlorinating agent selected from the group consisting of chlorine and cyanogen chloride, the proportions being at least two moles of hydrogen cyanide to one mole of chlorine, when chlorine is the chlorinating agent, and subjecting said mixture to reaction conditions at a temperature not lower than about 200° C. in the presence of a catalyst comprising activated carbon.

4. The process for converting hydrogen cyanide to cyanogen which comprises reacting one mole of chlorine with at least two moles of hydrogen cyanide in the vapor phase at a temperature not lower than about 200° C.

5. The process for converting hydrogen cyanide to cyanogen which comprises reacting one mole of chlorine with at least two moles of hydrogen cyanide in the vapor phase at a temperature not lower than about 200° C. in the presence of a catalyst comprising a surface active material.

6. The process for production of cyanogen which comprises reacting one mole of chlorine with at least two moles of hydrogen cyanide in the vapor phase in the presence of a catalyst comprising a surface active material.

7. The process for production of cyanogen which comprises reacting one mole of chlorine with at least two moles of hydrogen cyanide in the vapor phase in the presence of a catalyst comprising activated carbon at a temperature of about 200° C. to 1000° C.

8. The process for production of cyanogen which comprises preheating a gaseous mixture containing hydrogen cyanide and chlorine in the ratio of at least two moles of hydrogen cyanide for each mole of chlorine to a temperature of about 100° C. to 500° C., continuously passing said mixture through a reaction space at a temperature up to about 900° C., and recovering cyanogen from the resulting reaction products.

9. The process for production of cyanogen which comprises continuously passing a gaseous mixture containing hydrogen cyanide and chlorine in the ratio of approximately two moles of hydrogen cyanide for each mole of chlorine through a thermally insulated reaction space over an activated carbon catalyst whose temperature ranges up to about 600–1000° C., and recovering cyanogen from the resulting reaction products.

10. The process according to claim 9 in which said gaseous mixture is diluted with a recycled portion of the reaction of gas.

11. The process for production of cyanogen which comprises reacting hydrogen cyanide with cyanogen chloride in the vapor phase in the presence of a catalyst comprising a surface active material.

12. The process for production of cyanogen which comprises reacting hydrogen cyanide with cyanogen chloride in the vapor phase in the presence of a catalyst comprising activated carbon at a temperature not lower than about 200° C.

BURRITT S. LACY.
HARLAN A. BOND.
WILBIE S. HINEGARDNER.

Certificate of Correction

Patent No. 2,399,361. April 30, 1946.

BURRITT S. LACY ET AL.

It is hereby certified that error appears in the printed specification of the above numbered patent requiring correction as follows: Page 4, second column, line 5, claim 10, for "portion of the reaction of gas" read *portion of the reaction offgas*; and that the said Letters Patent should be read with this correction therein that the same may conform to the record of the case in the Patent Office.

Signed and sealed this 13th day of August, A. D. 1946.

[SEAL]

LESLIE FRAZER,
*First Assistant Commissioner of Patents.* comprising activated carbon at a temperature of about 200° C. to 1000° C.

8. The process for production of cyanogen which comprises preheating a gaseous mixture containing hydrogen cyanide and chlorine in the ratio of at least two moles of hydrogen cyanide for each mole of chlorine to a temperature of about 100° C. to 500° C., continuously passing said mixture through a reaction space at a temperature up to about 900° C., and recovering cyanogen from the resulting reaction products.

9. The process for production of cyanogen which comprises continuously passing a gaseous mixture containing hydrogen cyanide and chlorine in the ratio of approximately two moles of hydrogen cyanide for each mole of chlorine through a thermally insulated reaction space over an activated carbon catalyst whose temperature ranges up to about 600–1000° C., and recovering cyanogen from the resulting reaction products.

10. The process according to claim 9 in which said gaseous mixture is diluted with a recycled portion of the reaction of gas.

11. The process for production of cyanogen which comprises reacting hydrogen cyanide with cyanogen chloride in the vapor phase in the presence of a catalyst comprising a surface active material.

12. The process for production of cyanogen which comprises reacting hydrogen cyanide with cyanogen chloride in the vapor phase in the presence of a catalyst comprising activated carbon at a temperature not lower than about 200° C.

BURRITT S. LACY.
HARLAN A. BOND.
WILBIE S. HINEGARDNER.

Certificate of Correction

Patent No. 2,399,361. April 30, 1946.

BURRITT S. LACY ET AL.

It is hereby certified that error appears in the printed specification of the above numbered patent requiring correction as follows: Page 4, second column, line 5, claim 10, for "portion of the reaction of gas" read *portion of the reaction offgas*; and that the said Letters Patent should be read with this correction therein that the same may conform to the record of the case in the Patent Office.

Signed and sealed this 13th day of August, A. D. 1946.

[SEAL]

LESLIE FRAZER,
*First Assistant Commissioner of Patents.*